(12) United States Patent
Chung et al.

(10) Patent No.: US 10,502,754 B2
(45) Date of Patent: Dec. 10, 2019

(54) APPARATUS FOR MEASURING FLUID SPEED

(71) Applicant: INTEKBIO Co., LTD., Daejeon (KR)

(72) Inventors: Seok Chung, Seoul (KR); Jung Hyo Yoon, Namyangju-si (KR); Eun Doo Lee, Namyangju-si (KR); Se Woon Han, Albany, CA (US); Jae Ho Kim, Seoul (KR); Young Kyu Cho, Seoul (KR); David Lim, Seoul (KR); Yong Hun Jung, Seoul (KR); Seung Hun Hong, Seoul (KR)

(73) Assignee: INTEKBIO Co., LTD., Daejeon (KR)

( * ) Notice: Subject to any disclaimer, the term of this patent is extended or adjusted under 35 U.S.C. 154(b) by 278 days.

(21) Appl. No.: 15/518,288

(22) PCT Filed: Jun. 24, 2015

(86) PCT No.: PCT/KR2015/006451
§ 371 (c)(1),
(2) Date: Apr. 11, 2017

(87) PCT Pub. No.: WO2016/104892
PCT Pub. Date: Jun. 30, 2016

(65) Prior Publication Data
US 2017/0307650 A1    Oct. 26, 2017

(30) Foreign Application Priority Data
Dec. 22, 2014    (KR) .................. 10-2014-0185973

(51) Int. Cl.
*G01P 5/26* (2006.01)
*G01F 1/66* (2006.01)
*G01P 3/36* (2006.01)

(52) U.S. Cl.
CPC ................ *G01P 5/26* (2013.01); *G01F 1/661* (2013.01); *G01P 3/366* (2013.01)

(58) Field of Classification Search
CPC ............. G01P 5/26; G01F 1/708; G01S 17/00
See application file for complete search history.

(56) References Cited

U.S. PATENT DOCUMENTS

| | | | |
|---|---|---|---|
| 7,880,133 B2 | 2/2011 | Johansen | |
| 2006/0146910 A1* | 7/2006 | Koochesfahani | G01K 11/20 374/161 |

(Continued)

FOREIGN PATENT DOCUMENTS

| | | |
|---|---|---|
| DE | 20 2004 008 808 U1 | 9/2004 |
| JP | 09-281134 A | 10/1997 |

(Continued)

OTHER PUBLICATIONS

International Search Report for PCT/KR2015/006451 dated Oct. 6, 2015.

(Continued)

*Primary Examiner* — Luke D Ratcliffe
(74) *Attorney, Agent, or Firm* — Revolution IP, PLLC

(57) ABSTRACT

An apparatus for measuring fluid speed by using the refraction of light is disclosed. The apparatus includes: a channel in which a passage is formed to allow the flow of a fluid; a first and a second light source that are located in any one region of an upper part and a lower part of the channel; a sensor installed in an opposite region of the region where the first and second light sources are located with respect to the channel, to receive the light emitted from the first and second light sources; a speed calculation unit configured to calculate a speed of the fluid by using the intensity of the light received at the sensor.

5 Claims, 7 Drawing Sheets

(56) References Cited

U.S. PATENT DOCUMENTS

2009/0116011 A1* 5/2009 Kenyon ................ G01N 15/14
                                                    356/338
2012/0188531 A1   7/2012 Delville et al.

FOREIGN PATENT DOCUMENTS

| JP | 2006-300565 A    | 11/2006 |
| JP | 2007-504464 A    | 3/2007  |
| KR | 10-2009-0108428 A | 10/2009 |
| KR | 10-2012-0108052 A | 10/2012 |
| KR | 10-2013-0107119 A | 10/2013 |
| KR | 10-1317630 B1    | 10/2013 |

OTHER PUBLICATIONS

Korean Notice of Allowance dated Feb. 29, 2016 in connection with the counterpart Korean Patent Application No. 10-2014-0185973.
Korean Office Action dated Nov. 30, 2015 in connection with the counterpart Korean Patent Application No. 10-2014-0185973.
European search report of EP 15873420.2 dated May 3, 2018.

* cited by examiner

APPARATUS FOR MEASURING FLUID SPEED

CROSS REFERENCE TO RELATED APPLICATION

This present application is a national stage filing under 35 U.S.C § 371 of PCT application number PCT/KR2015/006451 filed on Jun. 24, 2015 which is based upon and claims the benefit of priority to Korean Patent Application Nos. 10-2014-0185973 filed on Dec. 22, 2014 in the Korean Intellectual Property Office. The disclosures of the above-listed applications are hereby incorporated by reference herein in their entirety.

BACKGROUND

1. Technical Field

The present invention relates to an apparatus for measuring fluid speed, more particularly to an apparatus for measuring the speed of a fluid by using the refraction of light emitted from two light sources.

2. Description of the Related Art

As the life expectancy of an average person has increased in modern times, so too has the variety of diseases suffered by the average person increased. As such, various diagnostic devices and diagnostic systems for preventing and diagnosing diseases are being developed.

One group of such devices are in vitro diagnostic devices, which use samples of bodily fluid such as blood, urine, etc., to detect those substances that need to be analyzed. Through quantitative analysis, these devices can quickly determine whether or not a patient has a disease, providing the advantages of speed, efficiency, and accuracy.

Also of interest is the biosensor, hick can be utilized in a variety of applications from testing for pregnancy to testing various diseases such as cancer and multiple sclerosis. As the biosensor uses DNA, miniscule proteins such as antibodies, and the like, the accuracy of the biosensor has become an important issue. Relevant prior art can be found in Korean Patent Publication No. 2009-0108428.

In regard to the in vitro diagnostics market, the fluid speed in a microfluidic channel can be different for each patient, due to differences in the viscosity of plasma. The measurement of fluid speed is also important in the fields of flow cytometry, cell sorting, micro flow switches, etc. However, apparatuses for measuring the speed of fluids either are complex, large, and expensive or produce results of low accuracy.

Thus, there is a need for more research on technology that can provide an inexpensive means for accurately measuring the speed of microfluids.

SUMMARY OF THE INVENTION

An objective of the present invention is to provide an apparatus for measuring fluid speed which not only can provide highly accurate measurements but also can be produced with low unit costs.

Another objective of the present invention is to provide an apparatus for measuring fluid speed that can be easily installed and used and can also provide highly accurate measurements.

Another objective of the present invention is to provide an apparatus for measuring fluid speed that uses the refraction of light emitted from two light sources to provide accurate measurements and can adjust the speed of the fluid based on the measurement results.

To achieve the objectives above, an embodiment of the invention provides an apparatus for measuring fluid speed that includes: a channel, in which a passage is formed to allow the flow of a fluid; a first light source and a second light source that are located in any one region of an upper part and a lower part of the channel; a sensor that is installed in an opposite region of the region where the first light source and the second light source are located with respect to the channel, to receive the emitted from the first light source and the second light source; and a speed calculation unit that calculates the speed of the fluid by using the intensity of the light received at the sensor.

The apparatus for measuring fluid speed according to an embodiment of the invention can be implemented using two light sources and a sensor that are relatively inexpensive and can be easily installed and readily used by any user.

Thus, an embodiment of the invention provides an apparatus for measuring fluid speed which not only can provide highly accurate measurements but also can be produced with low unit costs.

Additional aspects and advantages of the present invention will be set forth in part in the description which follows, and in part will be obvious from the description, or may be learned by practice of the invention.

DETAILED DESCRIPTION OF THE INVENTION

An apparatus for measuring fluid speed associated with an embodiment of the invention is described below with reference to the appended drawings.

In the present specification, an expression used in the singular encompasses the expression of the plural unless it has a clearly different meaning in the context. In the present specification, terms such as "comprising" or "including," etc., should not be interpreted as meaning that all of the elements or operations listed in the specification are necessarily included. That is, some of the elements or operations may not be included, while other additional elements or operations may be further included.

The 'speed of a fluid', as referred to in the present specification, can represent the speed at which a fluid fills a channel. Also, 'flow speed control' in the present specification can represent the control of the flow speed of a fluid during the process of the fluid filling the channel.

Figure 1:
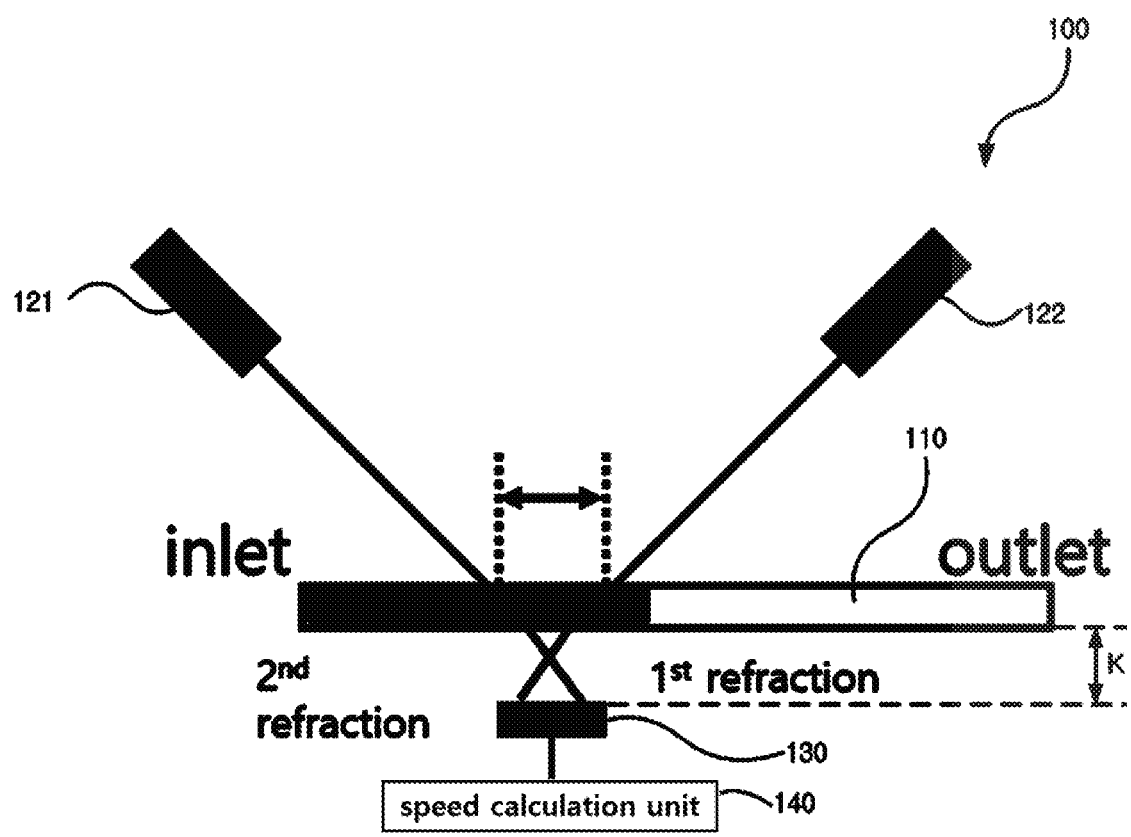
FIG. 1 and FIG. 2 illustrate an apparatus for measuring fluid speed associated with an embodiment of the invention.
Figure 2:
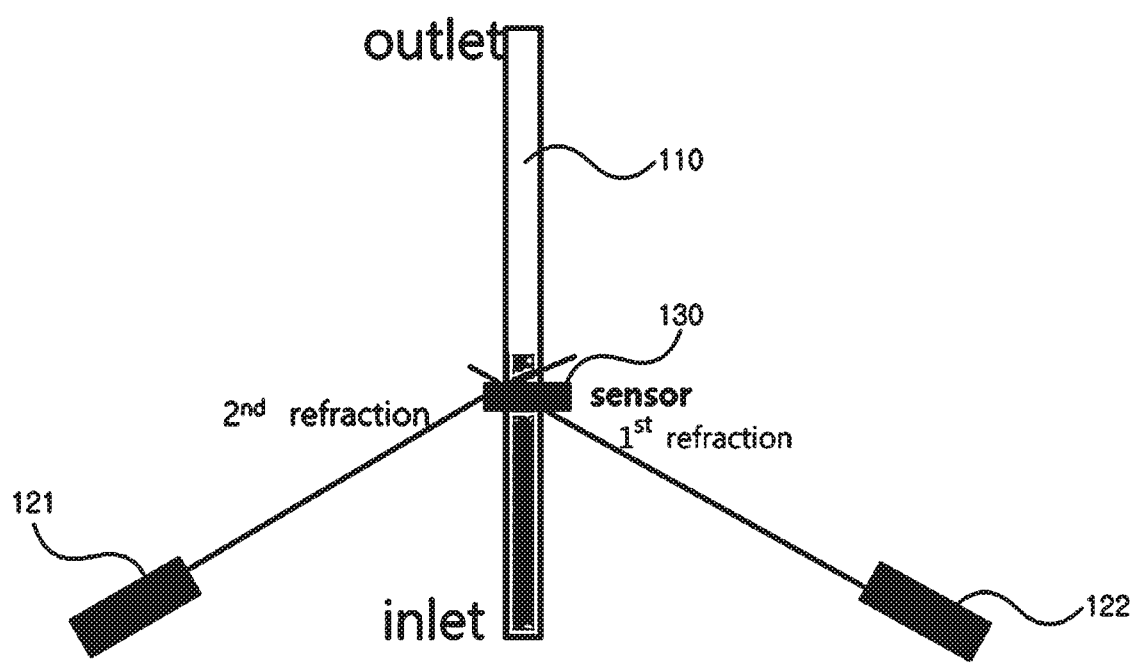

FIG. 1 and FIG. 2 illustrate an apparatus for measuring fluid speed associated with an embodiment of the invention.

As illustrated in the drawings, an apparatus 100 for measuring fluid speed can include a channel 110, a first light source 121, a second light source 122, a sensor and a speed calculation unit 140.

Within the channel 110, a passage is provided through which a fluid can flow. The fluid can include a microfluid and can serve as a test specimen. A test specimen refers to a solution subjected to testing and is a substance that is suspected of containing a target of analysis. For example, the test specimen can be a physiological fluid obtained from a biological source (e.g. a person, an animal, etc.), such as blood, saliva, cerebrospinal fluid, sweat, urine, milk, ascitic fluid, mucus, nasal fluid, hemoptoe, synovial fluid, abdominal fluid, and others.

Also, the test specimen can be obtained directly from a biological source or can be pretreated to reform the properties of the test specimen. Methods of pretreatment can include filtration, sedimentation, dilution, concentration, deactivation of interference components, lysis, adding reagents, and the like. For instance, a procedure of separating the plasma from a blood sample, or the like, can be performed.

The first light source 121 and second light source 122 can be positioned in a region above the channel 110 (i.e. in a region of an upper part of the channel 110), while the sensor 130 can be installed in a region below the channel (i.e. in a region of a lower part of the channel 110).

Of course, although it is not illustrated in the drawings, it is also possible to position the first light source 121 and second light source 122 below the channel 110 and install the sensor 130 above the channel. That is, according to an embodiment of the invention, the sensor 130 may be installed in an opposite region of the region where the first light source 121 and the second light source 122 are located, with respect to the channel 110.

The first light source 121 and the second light source 122 can be positioned such that light emitted from the light sources has incident angles other than 90 degrees with respect to the channel 110. If the light emitted from the first light source 121 and second light source 122 has an incident angle of 90 degrees with respect to the channel 110, then the light may be dispersed due to reflection, scattering, etc., resulting in a lowered sensitivity of the measurement.

Also, the first light source 121 and the second light source 122 can be positioned such that the light sources are not parallel with each other. If the angle between the first light source 121 and second light source 122 were to form 180 degrees (i.e. if the light sources were parallel), then the size of the sensor 130 for receiving the light emitted from the first light source 121 and second light source 122 would have to be larger and would thus incur higher costs.

Also, the angles and directions of the first light source 121 and second light source 122 with respect to the channel 110 may be adjustable. FIG. 2 shows an example in which the angles of the first light source 121 and second light source 122 with respect to the channel 110 have been adjusted from the arrangement shown in FIG. 1.

The angles and directions of the first light source 121 and second light source 122 can be adjusted, for example, according to the type of laser emitted by light source 121 and second light source 122. Also, the angles and directions of the first light source 121 and second light source 122 may be adjusted according to the structure of the chip support (not shown) or the shape of the chip.

The sensor 130 may be installed in a region below the channel 110 to receive the light emitted from the first light source 121 and second light source 122. The sensor 130 can be installed to receive all of the light emitted from both of the light sources 121, 122. That is, an apparatus for measuring fluid speed according to an embodiment of the invention enables lowered cost by utilizing a structure in which one sensor is used to receive light from two light sources.

Also, according to an embodiment of the invention, the first light source 121, the second light source 122, and the sensor 130 can be positioned such that the light emitted from the first light source 121 and the light emitted from second light source 122 intersect in a region below the channel 110 before being received at the sensor 130. By thus having the light intersect in a region at a lower part of the channel 110 and then enter the sensor 130, it is possible to reduce the size of the sensor 130.

The larger the distance (k) between the sensor 130 and the channel 110, the weaker the intensity of the light received at the sensor 130, and hence the lower the accuracy of the measurement. Thus, in consideration of the type of microfluid and the distance from the light sources, etc., the distance k can be set as 0.1-10 mm.

Also, the size of the sensor 130 can vary depending on the distance (d) between the first incident point, where the light emitted from the first light source 121 meets the channel 110, and the second incident point, where the light emitted from the second light source 122 meets the channel 110. Thus, in consideration of the fact that the type of fluid being measured is a microfluid, the distance d can be set as 1-10 mm.

The speed measurement unit 140 can measure the speed of the fluid by using the intensity of the light received at the sensor 130.

Figure 3:
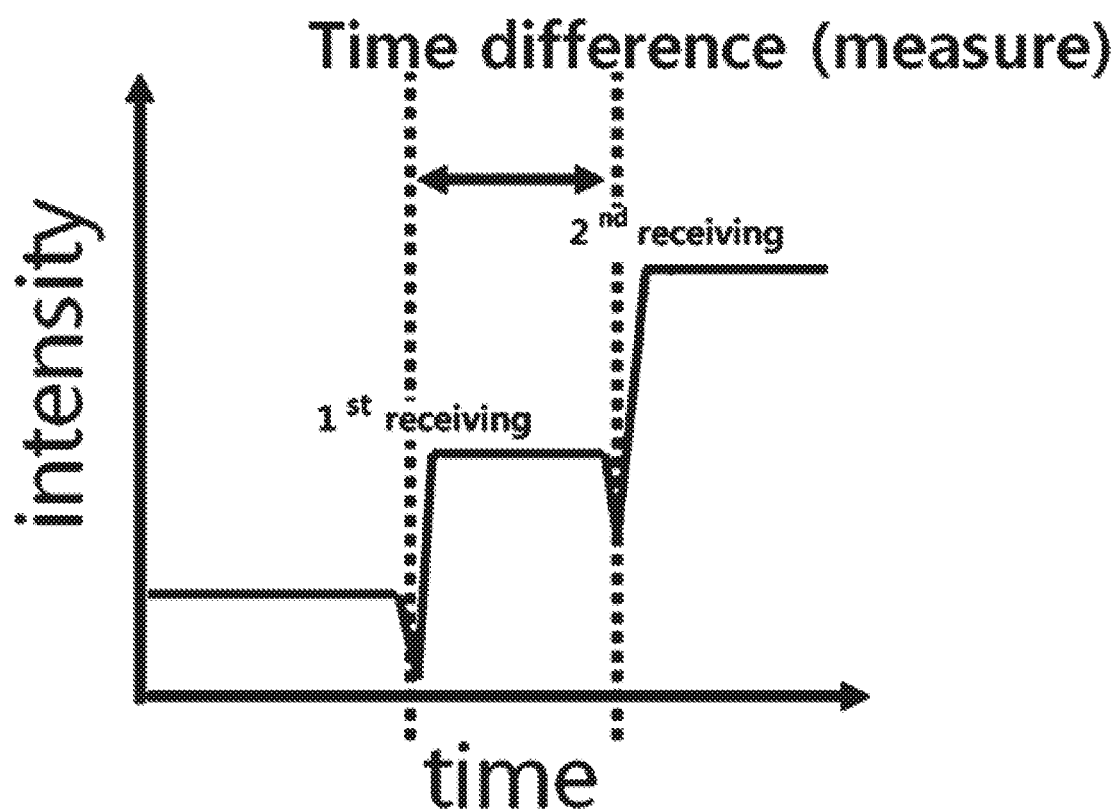
FIG. 3 shows a graph representing the principle used in measuring the speed of a fluid with an apparatus for measuring fluid speed associated with an embodiment of the invention.

FIG. 3 shows a graph representing the principle used in measuring the speed of a fluid with an apparatus for measuring fluid speed associated with an embodiment of the invention.

The graph can be divided into three regions by the vertical dotted lines. The left region represents the initial state where there is no fluid flowing in the channel 110, so that the two types of light emitted from the first light source 121 and the second light source 122 are received at the sensor 130 without any refraction. The middle region represents the state where the fluid has flowed only up to a certain space within the channel 110, so that the light emitted from the first light source 121 is received at the sensor 130 after it is refracted, but the light emitted from the second light source 122 is received at the sensor 130 without refraction. The right region represents the state where the fluid has sufficiently flowed within the channel 110, so that the light from the first light source 121 and the light from the second light source 122 are all refracted before being received at the sensor 130.

As can be seen from the graph of FIG. 3, the intensity of the light may undergo changes at a first refraction time point (the time point at which the light from the first light source begins) and at a second refraction time point (the time point at which the light from the second light source begins).

The time (t) it takes for the fluid to flow across distance d during this time difference between the refraction time points can be measured.

The speed calculation unit 140 can calculate the speed of the fluid by using the time t and the distance d.

According to an embodiment of the invention, the apparatus for measuring fluid speed can adjust the flow speed of the fluid based on the measured speed of the fluid.

Figure 4:
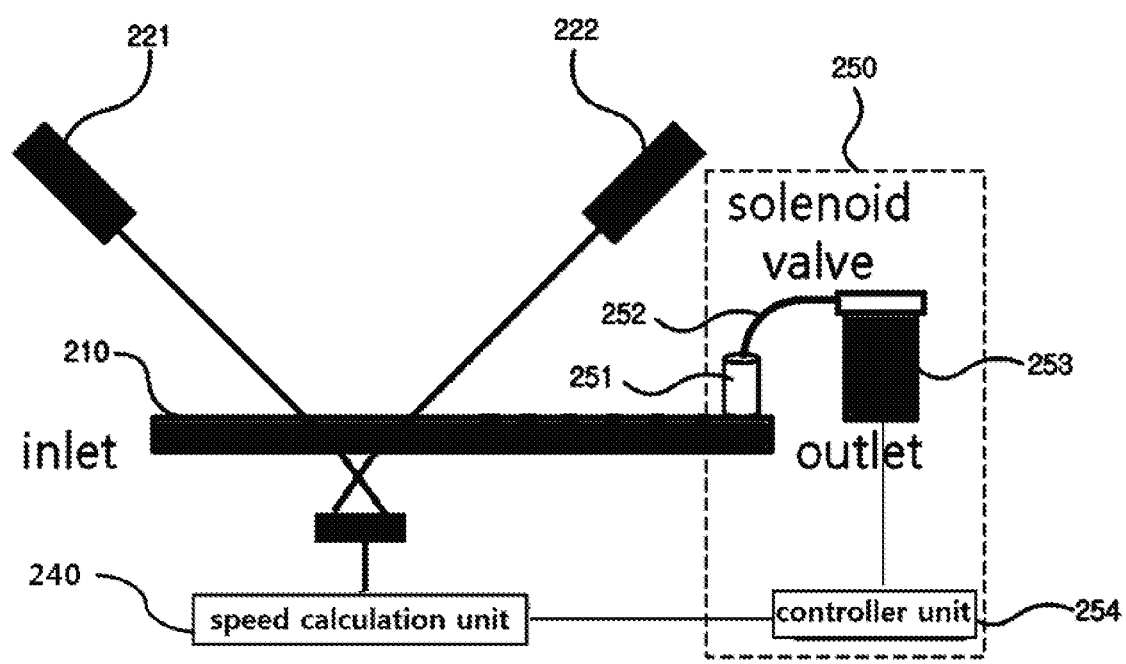
FIG. 4 illustrates an apparatus for measuring fluid speed associated with another embodiment of the invention.

FIG. 4 illustrates an apparatus for measuring fluid speed associated with another embodiment of the invention.

As illustrated in the figure, an apparatus 200 for measuring fluid speed can include a channel 210, a first light source 221, a second light source 222, a sensor 230, a speed calculation unit 240, and an adjustment unit 250.

Within the channel 210, a passage is provided through which a fluid can flow. The fluid can include a microfluid and can serve as a test specimen.

The first light source 221 and second light source 222 can be positioned in a region above the channel 210, while the sensor 230 can be installed in a region below the channel.

Of course, although it is shown in the drawings, it is also possible to position the first light source 221 and second light source 222 below the channel 210 and install the sensor 230 above the channel. That is, according to an embodiment of the invention, the sensor 230 may be installed in an opposite region of the region where the first light source 221 and the second light source 222 are located, with respect to the channel 210.

The first light source 221 and the second light source 222 can be positioned such that light emitted from the light sources has incident angles other than 90 degrees with respect to the channel 210. If the light emitted from the first light source 221 and second light source 222 has an incident angle of 90 degrees with respect to the channel 210, then the light may be dispersed due to reflection, scattering, etc., resulting in a lowered sensitivity of the measurement.

Also, the first light source 221 and the second light source 222 can be positioned such that the light sources are not parallel with each other. If the angle between the first light source 221 and second light source 222 were to form 180 degrees (i.e. if the light sources were parallel), then the size of the sensor 230 for receiving the light emitted from the first light source 221 and second light source 222 would have to be larger and would thus incur higher costs.

Also, the angles and directions of the first light source 221 and second light source 222 with respect to the channel 210 may be adjustable.

The angles and directions of the first light source 221 and second light source 222 can be adjusted, for example, according to the type of laser emitted by the first light source 221 and second light source 222. Also, the angles and directions of the first light source 221 and second light source 222 may be adjusted according to the structure of the chip support (not shown) or the shape of the chip.

The sensor 230 may be installed in a region below the channel 210 to receive the light emitted from the first light source 221 and second light source 222. The sensor 230 can be installed to receive all of the light emitted from both of the light sources 221, 222. That is, an apparatus for measuring fluid speed according to an embodiment of the invention enables lowered cost by utilizing a structure in which one sensor is used to receive light from two light sources.

Also, according to an embodiment of the invention, the first light source 221, the second light source 222, and the sensor 230 can be positioned such that the light emitted from the first light source 221 and the light emitted from the second light source 222 intersect in a region below the channel 210 before being received at the sensor 230. By thus having the light intersect in a region at a lower part of the channel 210 and then enter the sensor 230, it is possible to reduce the size of the sensor 230.

The speed measurement unit 240 can measure the speed of the fluid by using the intensity of the light received at the sensor 230. Regarding the measuring of the speed of the fluid, the descriptions provided with reference to FIG. 3 also apply here.

The adjustment unit 250 can adjust the flow speed of the flowing fluid based on the calculated speed of the fluid. The adjustment unit 250 can include a vent hole part 251, a tube 252, a valve 253, and a controller part 254.

The vent hole part 251 can be connected with the exterior of the channel 210 to exhaust air inside the channel 210 to the outside.

The valve 253 can be connected to the entrance part of the vent hole part 251 by way of a tube 252 and can open and close the entrance part of the vent hole part 251 according to a preset time schedule.

The controller part 254 can control the operation of the valve 253. For example, the controller part 254 can apply On signals and Off signals to the valve 253 based on the calculated speed of the fluid. More specifically, the controller part 254 can determine the durations for applying an On signal and an Off signal, the number of times the signals are applied, the order in which they are applied, and the like. In particular, the durations of the On signal and Off signal, the number of signal applications, and the order of the signal applications can be stored in the form of a table in the controller part 254.

When the On signal and Off signal for the valve 253 are determined as above according to the flow speed of the fluid, the controller part 254 can control the valve 253. More specifically, the controller part 254 can alternatingly apply On signals and Off signals to the valve 253.

Also, the controller part 54 can set the duration of an On signal and the duration of an Off signal to be different from each other. More specifically, the duration of applying an On signal can be formed shorter than the duration of applying an Off signal.

For example, the controller part 254 can apply the On signal to the valve 253 for a first duration if the flow speed of the fluid is a first flow speed. Also, the controller part 254 can apply the Off signal to the valve 253 for a second duration. Here, the first duration and the second duration can be formed differently as described above.

Figure 5:
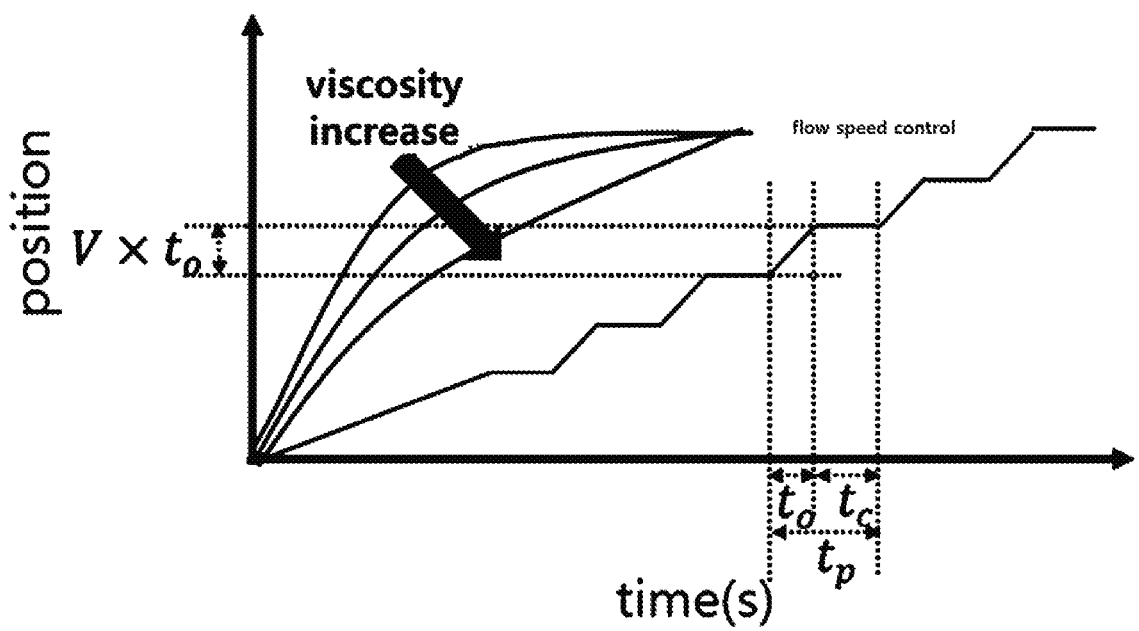
FIG. 5, FIG. 6, and FIG. 7 show graphs representing principles used in measuring the speed of a fluid and controlling the flow speed with an apparatus for measuring fluid speed associated with an embodiment of the invention.

FIG. 5 shows a graph representing the principles used in controlling flow speed with an apparatus for measuring fluid speed associated with an embodiment of the invention.

tp represents the sum of the durations of an opening and a closing of the valve and thus represents the duration of a unit periodic cycle. tp=valve open duration (to)+valve closed duration (tc). v represents the measured flow speed.

When the vent hole part 251 connected with the channel 210 is closed, an amount of air pressure may be applied on the substance flowing inside the channel 210 because of the air within the channel 210, and if the resistance due to air pressure becomes the same as the capillary force of the channel, the substance within the channel may become immobile. Furthermore, since the viscosity of a fluid may change with time, the flow speed can be adjusted in consideration of the changing viscosity of the fluid.

Figure 6:
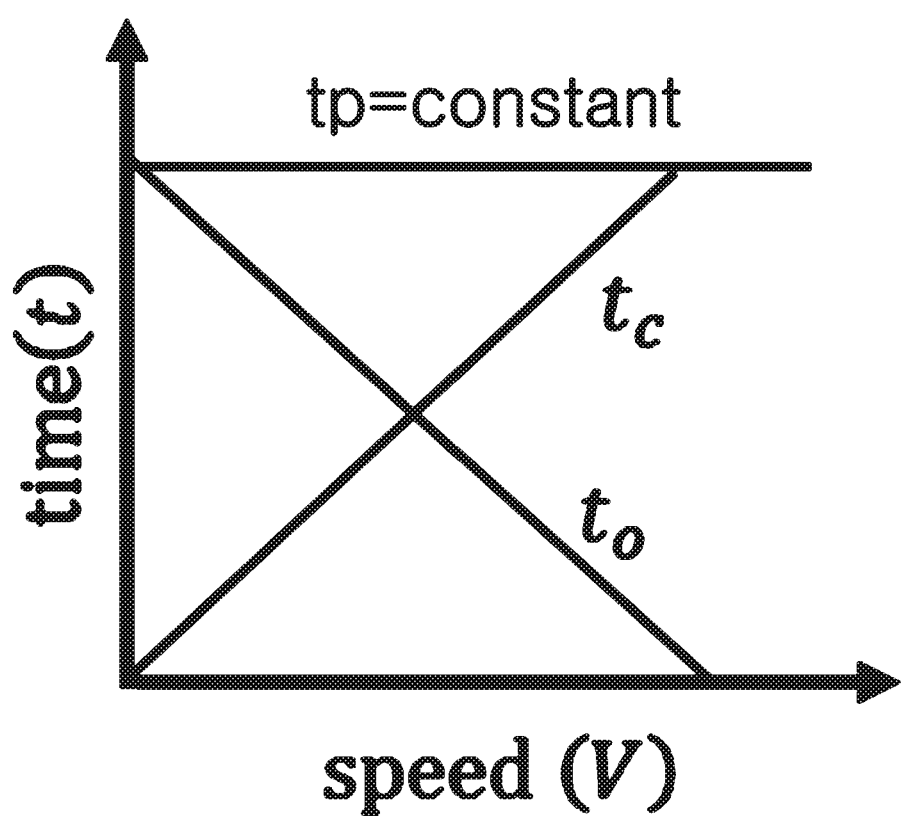
Figure 7:
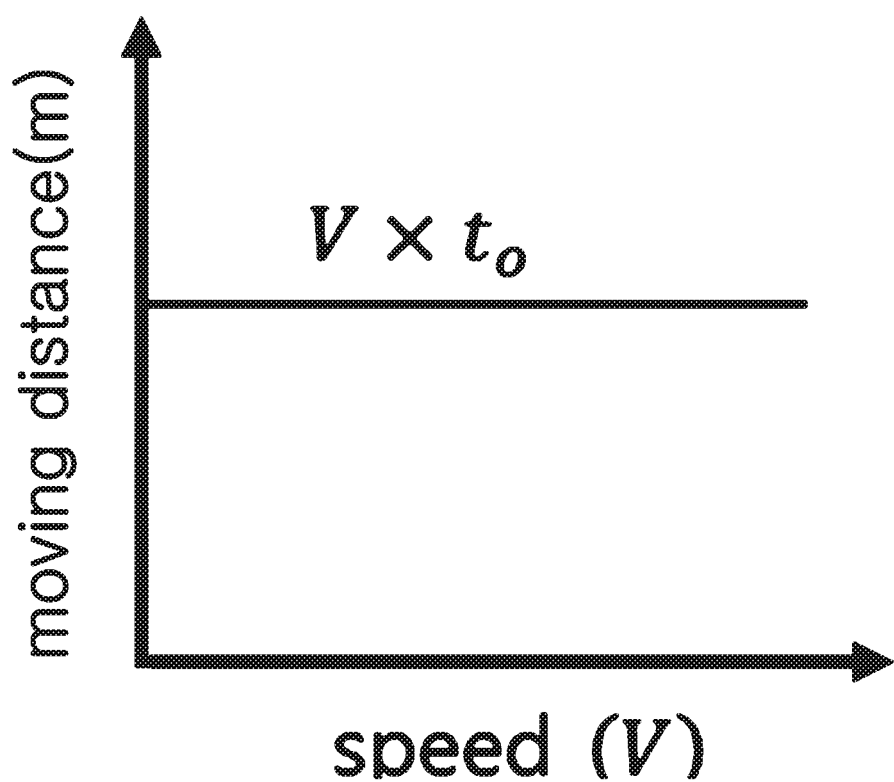

FIG. 6 represents the relationship between flow speed and time when tp is constant, and FIG. 7 represents the relationship the measured flow speed and the moving distance of the fluid.

If the flow speed is high, then the distance moved during the open duration would be large, and as such, it may be conceivable to decrease the open duration and increase the closed duration. Also, since a higher flow speed results in an increased moving distance per unit time, it may be conceivable to keep the flow speed constant by regulating the open duration.

The measuring of the speed of a fluid according to an embodiment of the inventions described above can be adopted even for transparent fluids, since it uses the refraction of light.

The method of measuring and controlling fluid speed described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the invention or can be a type of medium known to and used by the skilled person in the field of computer software.

A computer-readable medium may include a hardware device that is specially configured to store and execute program instructions. Some examples may include magnetic media such as hard disks, floppy disks, magnetic tapes, etc., optical media such as CD-ROM's, DVD's, etc., magneto-optical media such as floptical disks, etc., and hardware devices such as RUM, RAM, flash memory, etc.

On the other hand, the computer-readable medium can be a transmission medium, such as optical signals, metal-based lines, waveguides, etc., which transmit carrier waves that transmit signals for specifying program commands, data structures, and the like.

Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

An apparatus for measuring fluid speed as described above is not to be limited to the compositions and methods associated with the embodiments disclosed above. The above embodiments allow for various modifications, and it is conceivable to selectively combine all or some of the features of the various embodiments.

What is claimed is:

1. An apparatus for measuring fluid speed, the apparatus comprising:
   a channel having a passage formed therein for holding a fluid flowing therethrough;
   a first light source and a second light source located in any one region of an upper part and a lower part of the channel;
   a sensor installed in an opposite region of the region where the first light source and the second light source are located with respect to the channel, the sensor configured to receive light emitted from the first light source and the second light source; and
   a speed calculation unit configured to calculate a speed of the fluid by using an intensity of light received at the sensor,
   wherein the speed calculation unit calculates the speed of the fluid by using a time point at which the intensity of the light changes and distance information regarding a distance between a first incident point and a second incident point, the first incident point being a point where the light emitted from the first light source meets the channel, and the second incident point being a point where the light emitted from the second light source meets the channel,
   wherein an angle of the first light source and the second light source with respect to the channel is adjustable.

2. The apparatus for measuring fluid speed of claim 1, wherein a size of the sensor is determined based on a distance between the channel and the sensor.

3. The apparatus for measuring fluid speed of claim 1, wherein the first light source and the second light source are positioned such that light is not incident a perpendicular angle with respect to a direction of a flow of the fluid formed in the channel.

4. The apparatus for measuring fluid speed of claim 1, wherein the first light source and the second light source are positioned such that light emitted from the first light source and light emitted from the second light source are not parallel with each other.

5. The apparatus for measuring fluid speed of claim 4, wherein light emitted from the first light source and light emitted from the second light source are received at the sensor after intersecting in the opposite region.

* * * * *